United States Patent [19]
Dent

[11] Patent Number: 4,955,641
[45] Date of Patent: Sep. 11, 1990

[54] PIPE SEALS USED IN UNDERGROUND SEALED DISTRIBUTION SYSTEMS

[76] Inventor: Larry G. Dent, 3312 West Side Hwy., Castlerock, Wash. 98611

[21] Appl. No.: 315,517

[22] Filed: Feb. 27, 1989

[51] Int. Cl.⁵ .............................................. F16L 17/00
[52] U.S. Cl. ...................................... 285/96; 285/237
[58] Field of Search ................................. 285/96, 237

[56] References Cited

U.S. PATENT DOCUMENTS

| | | | |
|---|---|---|---|
| 1,800,085 | 4/1931 | Kroeger et al. | 285/96 X |
| 2,099,722 | 11/1937 | Byers . | |
| 2,306,160 | 12/1942 | Freyssinet . | |
| 2,309,658 | 2/1943 | Miller . | |
| 2,922,664 | 1/1960 | Risley et al. | 285/96 |
| 3,222,076 | 12/1965 | Hollingsworth . | |
| 3,486,772 | 12/1969 | Elsner | 285/96 |
| 3,572,769 | 3/1971 | Lingl | 285/96 |
| 3,737,179 | 6/1973 | White, Jr. | 285/96 |
| 3,787,061 | 1/1974 | Yoakum . | |
| 3,832,438 | 8/1974 | Pitcher . | |
| 3,879,067 | 4/1975 | Keyser . | |
| 3,958,313 | 5/1976 | Rossborough | 285/237 X |
| 4,216,981 | 8/1980 | Jensen . | |
| 4,296,933 | 10/1981 | Tolliver . | |
| 4,333,662 | 6/1982 | Jones . | |
| 4,350,351 | 9/1982 | Martin . | |
| 4,508,355 | 4/1985 | Ditcher . | |
| 4,598,915 | 7/1986 | Gilbert . | |
| 4,693,499 | 9/1987 | Serve | 285/96 |

Primary Examiner—Randolph A. Reese
Assistant Examiner—Carol I. Bordas
Attorney, Agent, or Firm—Roy E. Mattern, Jr.

[57] ABSTRACT

For use in underground sealed liquid distribution systems, embodiments of pipe seals are used to seal between various components used, such as pipes to manholes, pipes to reservoirs, pipes to pipes, repair couplings to pipes, couplings to corrugated pipe and between corrugated pipes, and tee connections to sewer pipes. In each embodiment of a pipe seal, a circumferential seal is initially substantially inserted in a circular receiving volume of a circular positioner. In some embodiments of these pipe seals, each circular positioner has two circular receiving volumes, each one receiving a circumferential seal. After the prepositioning of these pipe seals, a solidifiable liquid is directed under pressure through an opening or openings in a circular positioner to radially move a seal or seals into sealing contacts, as the solidifiable liquid increases in quantity within the circular receiving volume or volumes to move the circumferential seal or seals, in part, out of their respective circular receiving volumes and into sealing contact with a component or components of the underground sealed liquid distribution system.

2 Claims, 5 Drawing Sheets

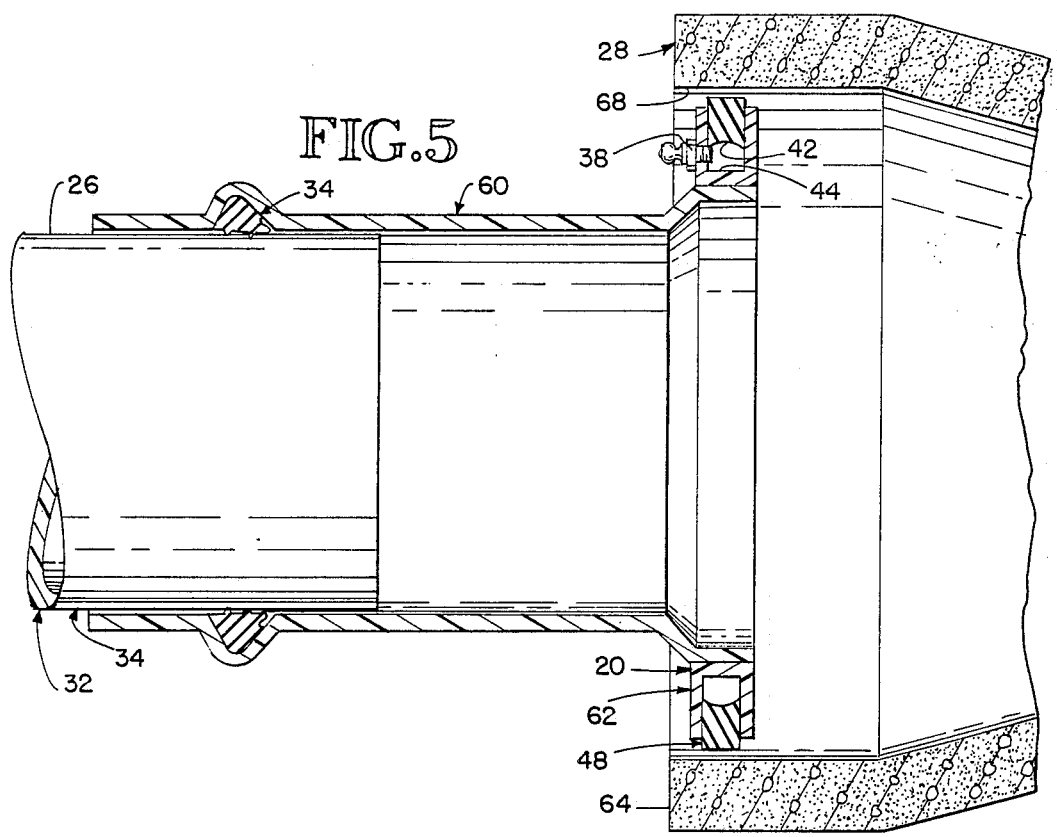
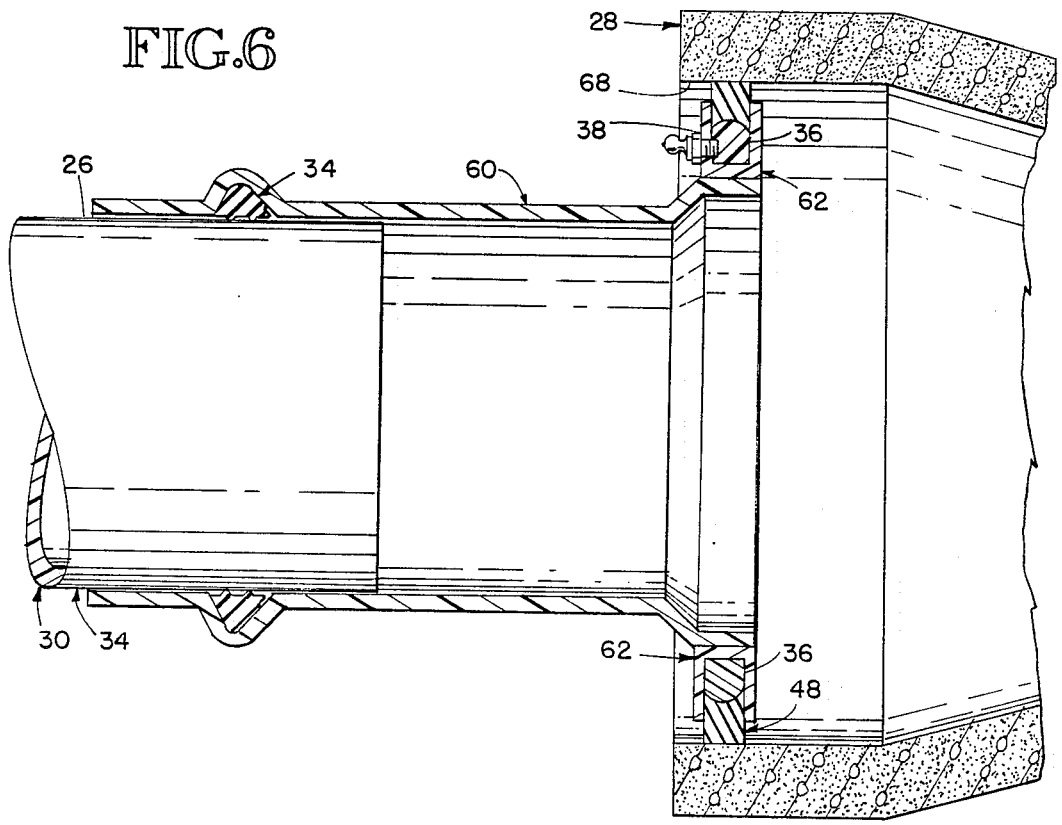

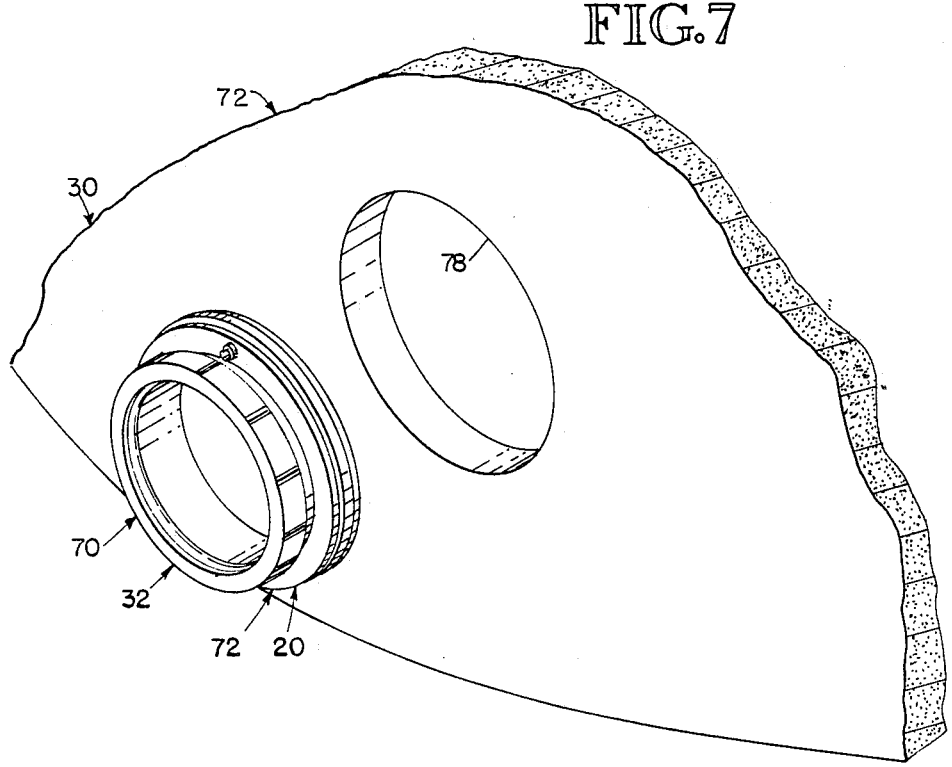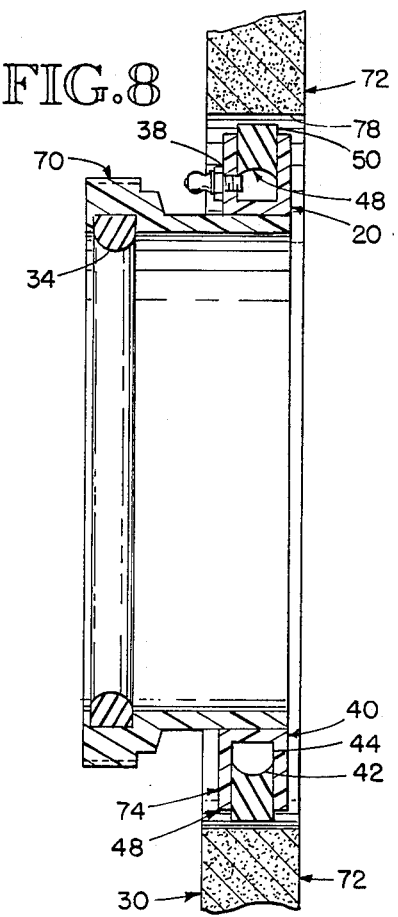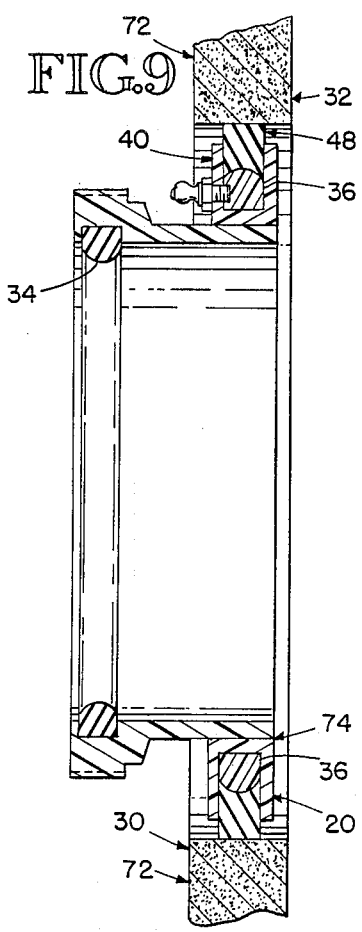

PIPE SEALS USED IN UNDERGROUND SEALED DISTRIBUTION SYSTEMS

BACKGROUND

Establishing at the outset an excellent long lasting seal between combinations of components installed in an underground sealed liquid distribution system, has always been a prime objective. The same prime objective carries over to making repairs, changing, and extending, such underground sealed liquid distribution systems.

In the past, inventors have provided pipe seals, gaskets, and packing, which during the final positioning thereof, receive internally a liquid, which subsequently hardens, in attempting to provide long lasting seals between combinations of such components.

For example:

In 1937, John A. Byers in his U.S. Pat. No. 2,099,722, illustrated and described his pipe joint. He utilized a sealing gasket which had a cavity. He filled this cavity with a solidifiable fluid such as felted paraffine, wax, lead, or sulphur compounds. Upon the entry of the solidifiable fluid, the sealing gasket expanded to create a good seal, and the seal remained when the fluid hardened.

In 1942, Eugene Freyssinet in his U.S. Pat. No. 2,306,160 disclosed his packing device in various embodiments sealing between various components. The liquid he used as a filler was a synthetic resin, which passed from a liquid state to a solid state. The resin was called by the trademark as being "Brauthite", and was said to be a combination of formaldehyde and phenol, which hardens in the presence of air.

In 1965, Albert A. Hollingsworth, in his U.S. Pat. No. 3,222,076, disclosed his pipe joint packing. He used a gasket with an initially collapsed central cavity. Then when the gasket was located in the sealing position, he injected into this central cavity, selected epoxy fill materials, such as epichlorohydrin and bisphenol-A, which, while reacting together, entered as a liquid and then self hardened, expanding the gasket into the sealing shape and position. Other fill materials used were epoxy novolacs, polyesters, phenolics, and melamines.

In 1982, A. Eugene Martin, in his U.S. Pat. No. 4,350,351, illustrated and described his manhole joint gasket assembly and the joint formed therewith. To increase the sealing power of his gasket he surrounded the back of the gasket with a hollow ring. Then to increase the backing power of this ring, he injected a two-component foam-forming, originally liquid substance, that expanded into a solid stage under pressure in the hollow interior of this backing ring.

In 1985, John Ditcher, in his U.S. Pat. No. 4,508,355 disclosed his gasket suitable for use in sealing the exterior of sewer pipe to an opening in a manhole, and the method and system employing the same. His circumferential gasket in various embodiments was fitted to a specially formed circular receiving volume, located in the well of the manhole, about the hole through which the end of a sewer pipe was inserted. When required, to insure an adequate seal would be maintained by the gasket, Mr. Ditcher filled a cavity in the gasket, after the positioning thereof, with an expandable filler, by using a hypodermic like syringe.

The accomplishments of these prior inventors are recognized; however, there remained a need for improved pipe seals, incorporating solidifiable liquids, which could be used throughout underground sealed liquid distribution systems to create excellent seals between combinations of many components of many different types, materials, and sizes, which often also have irregular surfaces, shapes, and sizes, and which often must remain misaligned, yet withstand high pressures.

SUMMARY

To create at the outset excellent long lasting seals between combinations of components installed in an underground sealed liquid distribution system, various embodiments of pipe seals are provided. Sealing between essentially all combinations of components is successfully undertaken, regardless of their sizes, their surfaces, their materials, such as plastic, cast iron, steel, corrugated metal, or concrete, or their misalignment, often excessive and non correctable.

The basic embodiments of this pipe seal, each have a circular positioner, in turn having a circular receiving volume into which a circumferential seal is slidably fitted. As so fitted, this pipe seal has a projecting side with a sealing surface, and an inserted side formed to create a starting volume within the circular receiving volume of the circular positioner.

When this pipe seal is positioned between combinations of components in the sealing locale, a solidifiable liquid is injected through a circular opening in the circular positioner to reach the starting volume. As additional quantities of this solidifiable liquid are injected under pressure, the circumferential seal is moved radially into an excellent long lasting sealing position, while guided by the circular positioner, which continues to assist in maintaining the position of the circumferential seal.

In the basic embodiments of these pipe seals, the circumferential seals are moved radially outwardly, while expanding in some basic embodiments, or these seals are moved radially inwardly, while contracting, in other basic embodiments. Then in more extensive embodiments of these pipe seals, the circumferential seals are located two at a time to circular positioners which have two circular receiving volumes. When these more extensive embodiments are in their sealing locales, the dual injections of the solidifiable liquids, move one circumferential seal radially inwardly and move one circumferential seal radially outwardly.

These pipe seals are used with components already provided by manufacturers, and these components require no changes in their original sizes, shapes, and surface conditions. Whatever the selected combinations of these components are, as used in completing, changing, adding, and/or repairing an underground sealed liquid distribution system, these pipe seals, in their respective embodiments, are utilized to establish at the outset an excellent long lasting seal, regardless of the specified and/or operating pressure ranges, and regardless of the extent of the possible misalignments of the components, which are not correctable.

DRAWINGS OF THE PREFERRED EMBODIMENTS

The pipe seals for incorporation into various combinations of components installed in an underground sealed liquid distribution system, in their various embodiments, are shown in the drawings, which also illustrate some of the combinations of the components, wherein:

FIG. 5 is a side view, with portions removed to show the cross-section of the pipe seal embodiment, shown in FIG. 4, before the injection of the solidifiable liquid, with the plastic pipe coupling and the concrete pipe in their assembled positions;

FIG. 6 is a side view, similar to FIG. 5, showing the cross-section of the pipe seal embodiment, after the injection of the solidifiable liquid, illustrating how the circumferential seal is moved into contact with the concrete pipe, creating the seal;

FIG. 7 is an exploded perspective view, with some portions removed, to show the arrangement of a manhole adapter, and a concrete manhole being assembled, as components in an underground sealed liquid distribution system 32, with the manhole adapter equipped with another embodiment of this pipe seal, and only some portions of the manhole are shown;

FIG. 8 is a side view, with portions removed, to show the cross-section of the pipe seal embodiment, shown in FIG. 7, before the injection of the solidifiable liquid, with the manhole adapter and the concrete manhole in their assembled positions;

FIG. 9 is a side view, similar to FIG. 8, showing the cross-section of the pipe seal embodiment, after the injection of the solidifiable liquid, illustrating how the circumferential seals are moved into contact with the concrete manhole creating the seal;

Figure 10:
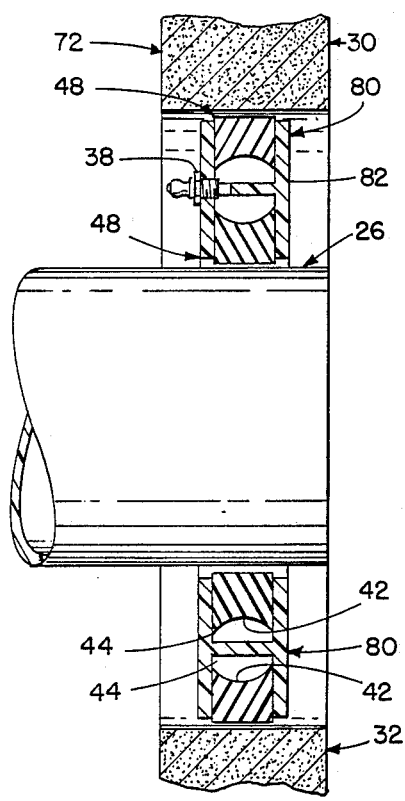
FIG. 10 is a partial side sectional view to show the entry of a portion of a pipe, whether made of plastic, concrete, steel, corrugated metal, or cast iron, into a circular opening in a portion of a concrete manhole, while the pipe is being held and another embodiment of the pipe seal is being positioned.
Figure 11:
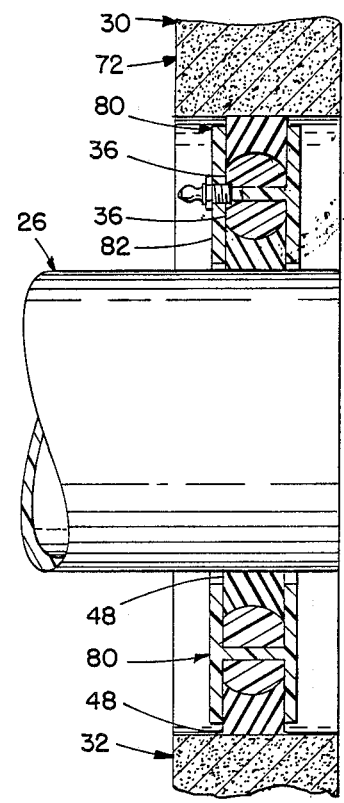
Figure 12:
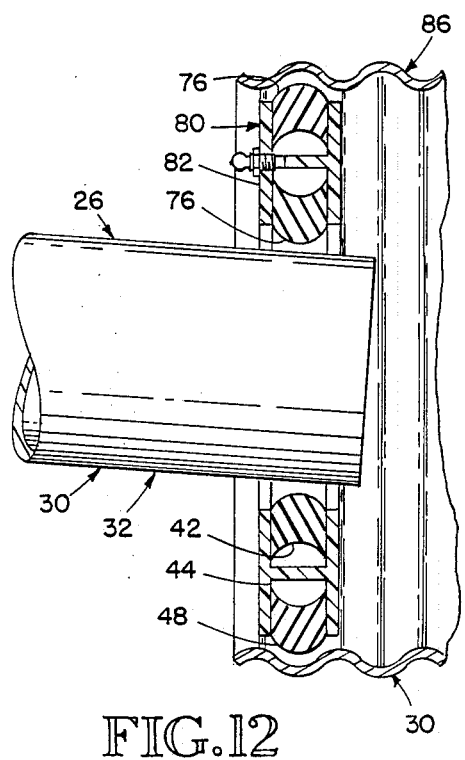
Figure 13:
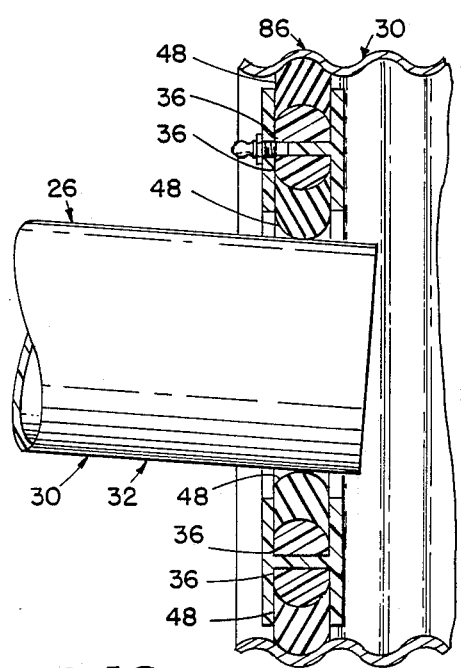

FIG. 11 is a view similar to FIG. 10, showing the pipe seal in the sealing position after the injection of the solidifiable liquid; and FIGS. 12 and 13 show another embodiment of the pipe seal, similar to the pipe seal shown in FIGS. 10 and 11, in an arrangement where the projecting sides of the pipe seal are convex to accommodate more irregularities of non alignment of the pipe and the irregularities of the surface of a corrugated pipe at the locations of the sealing contacts.

DESCRIPTIONS OF PREFERRED EMBODIMENTS

These pipe seals 20 in their various embodiments are manufactured and then installable primarily in the field where combinations of components 30 are being installed in underground sealed liquid distribution systems 32. These systems 32 mainly are fresh water distribution systems, or sewer collection and distribution systems.

The combinations of components 30, include the mixed assemblies of concrete, plastic, cast iron, steel, and corrugated metal components 30. In their assembly these mixed components 30 may at times remain substantially misaligned, yet excellent sealing is accomplished upon the final installation of these pipe seals 20. Selected assemblies of mixed components 30 with selected embodiments of these pipe seals 20 are illustrated in the drawings.

Figure 1:
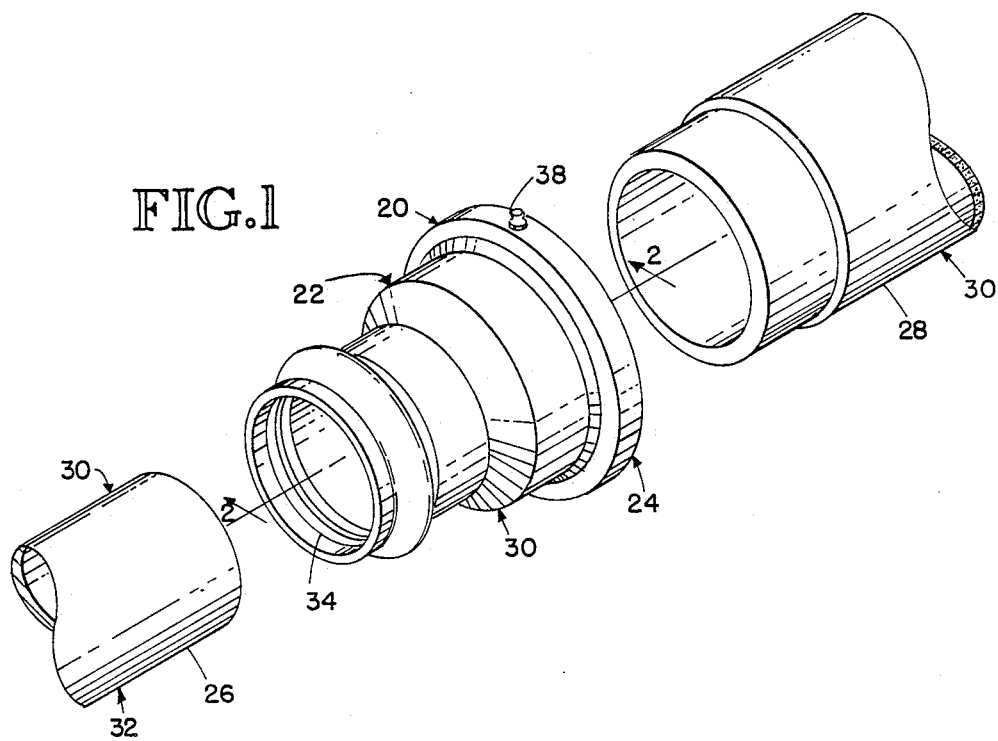
FIG. 1 is an exploded perspective view, with some portions removed, to show the arrangement of a plastic pipe, a plastic pipe coupling, and a concrete pipe being assembled into an underground sealed liquid distribution system, with the plastic pipe coupling equipped with an embodiment of this pipe seal.
Figure 2:
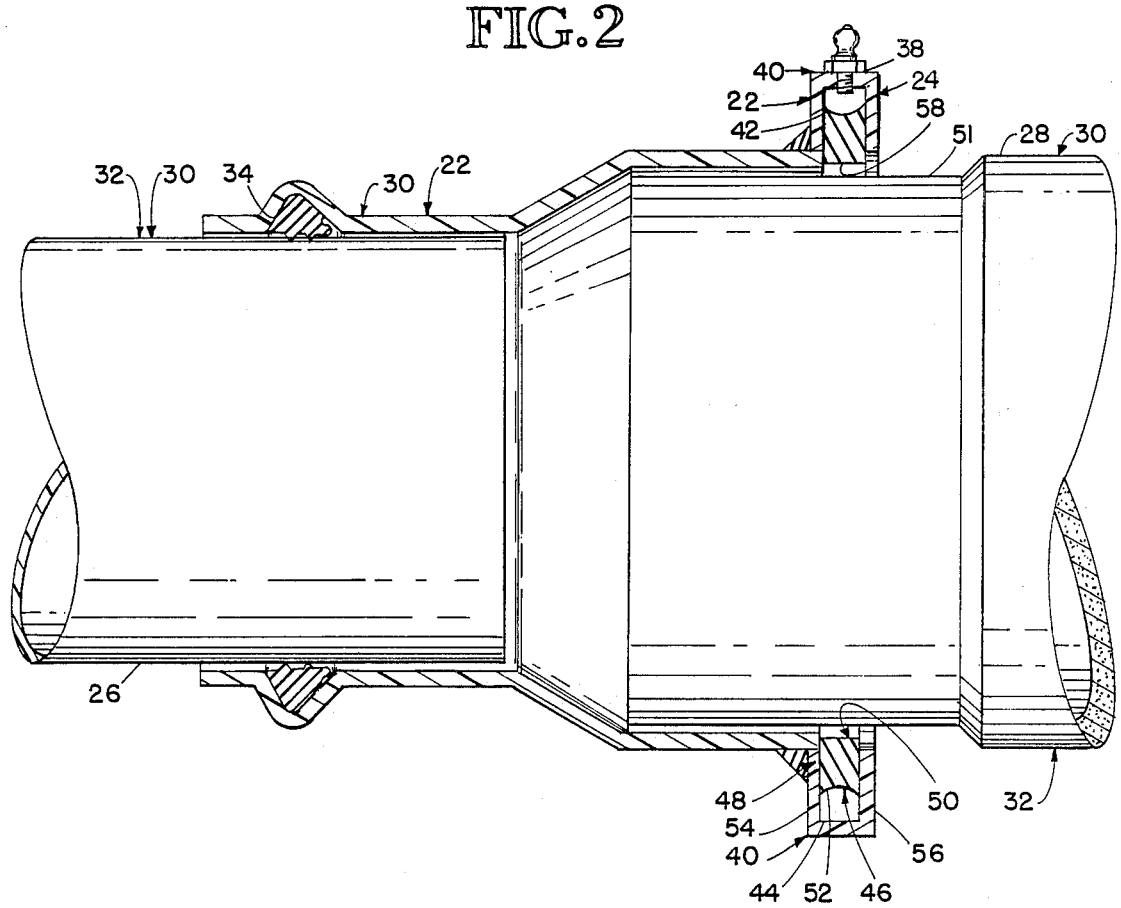
FIG. 2 is a side view, with portions removed to show the cross-section of the pipe seal embodiment, shown in FIG. 1, before the injection of the solidifiable liquid, with portions of the plastic pipe coupling and the concrete pipe in their assembled positions.

In FIG. 1, a pipe to pipe plastic adapter 22, having one embodiment 24 of the pipe seal 20, is shown before being used to join a PVC pipe 26 to a concrete pipe 28, which are the components 30 being connected in an underground sealed liquid distribution system 32. In FIG. 2 these components 30 are joined together and the pipe seal 24, which is sealably secured, essentially integrally, on the pipe to pipe adapter 22, is in position to be finally sealed about the concrete pipe 28.

Inside this pipe to pipe plastic adapter 22 is a pipe seal 34 which is to be considered a standard seal 34, which is supplied with such adapters 22. This seal 34 creates the seal between the PVC pipe 26 and the pipe to pipe adapter 22, at one end thereof.

Figure 3:
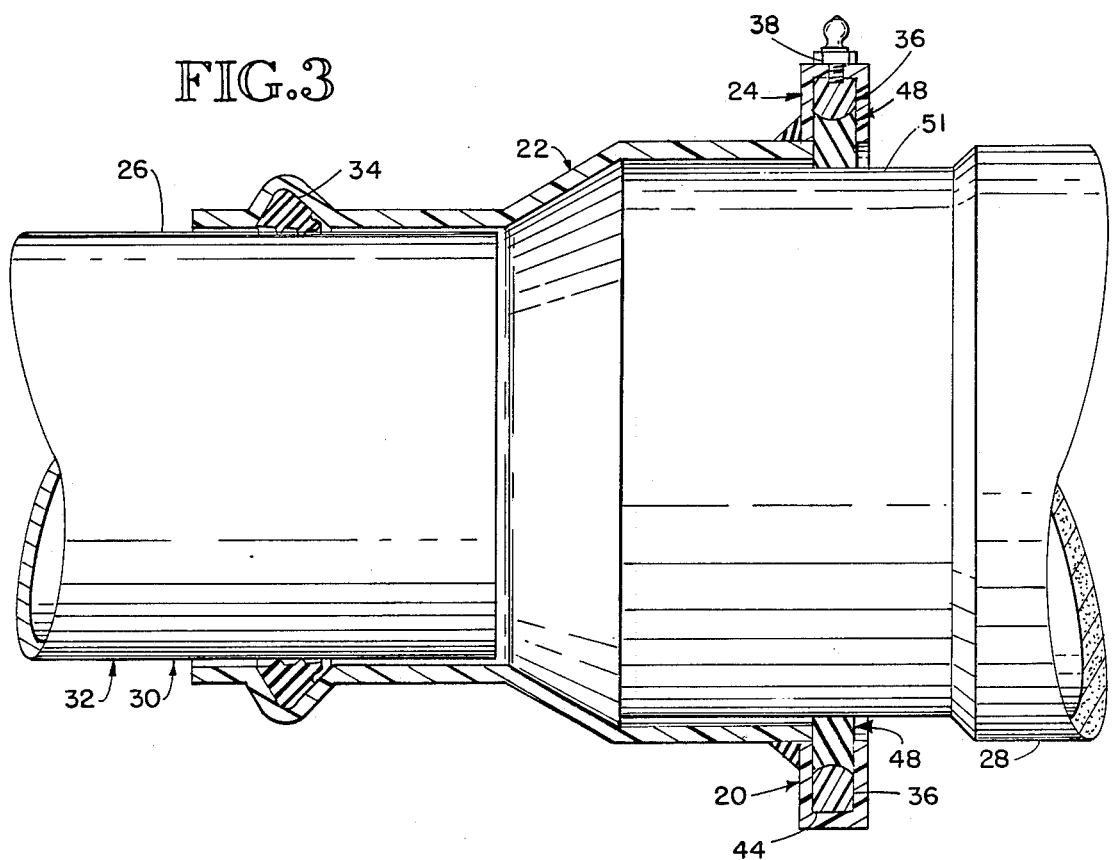
FIG. 3 is a side view, similar to FIG. 2, showing the cross-section of the pipe seal embodiment, after the injection of the solidifiable liquid, illustrating how the circumferential seal is moved into contact with the concrete pipe creating the seal.

In FIG. 3, the final seal, at the other end thereof, between the concrete pipe 28 and the pipe to pipe adapter 22 has been completed by using the pipe seal 20, in reference to the embodiment 24 thereof. A solidifiable liquid 36 has been injected through the circular opening 38 in the circular positioner 40. This liquid 36 enters a starting volume 42 bounded by portions of a circular receiving volume 44 of the circular positioner 40 and an inserted side 46 of the circumferential seal 48. As more solidifiable liquid 36 is passed through the circular opening 38, under pressure, the circumferential seal 48 is moved radially inwardly and the projecting side 50 of this seal 48 completely contacts the exterior rough surface 51 of the concrete pipe 28. This excellent seal is maintained as the solidifiable liquid 36 becomes hard and so remains hard.

A commencing two part pressure creating dispenser, commercially available, not shown, containing separated portions of commercially available selected liquids, is used to mix and to direct these portions into the circular receiving volume 44. They are, as mixed, used to move the circumferential seal 48 into the sealing position and to thereafter solidify to hold this seal 48 in place.

Each circumferential seal 48, preferably has an inserted side 46 which is formed to insure the creation of the starting volume 42. The preferred form is a concave surface 52. Also each circumferential seal 48 has alike opposite sides 54, 56, each one extending between the inserted side 46 or inserted end 46, and the projecting side 50, or sealing end 50, which are formed to closely slide relative to the circular receiving volume 44 of the circular positioner 40. These sliding surfaced sides 54, 56, are shown to be all parallel. Some complementary tapering of them could be undertaken. In FIGS. 1, 2, and 3, the projecting side 50 is shown to have a planar sealing surface 58. However a concave sealing surface, as subsequently described, is also utilized.

Figure 4:
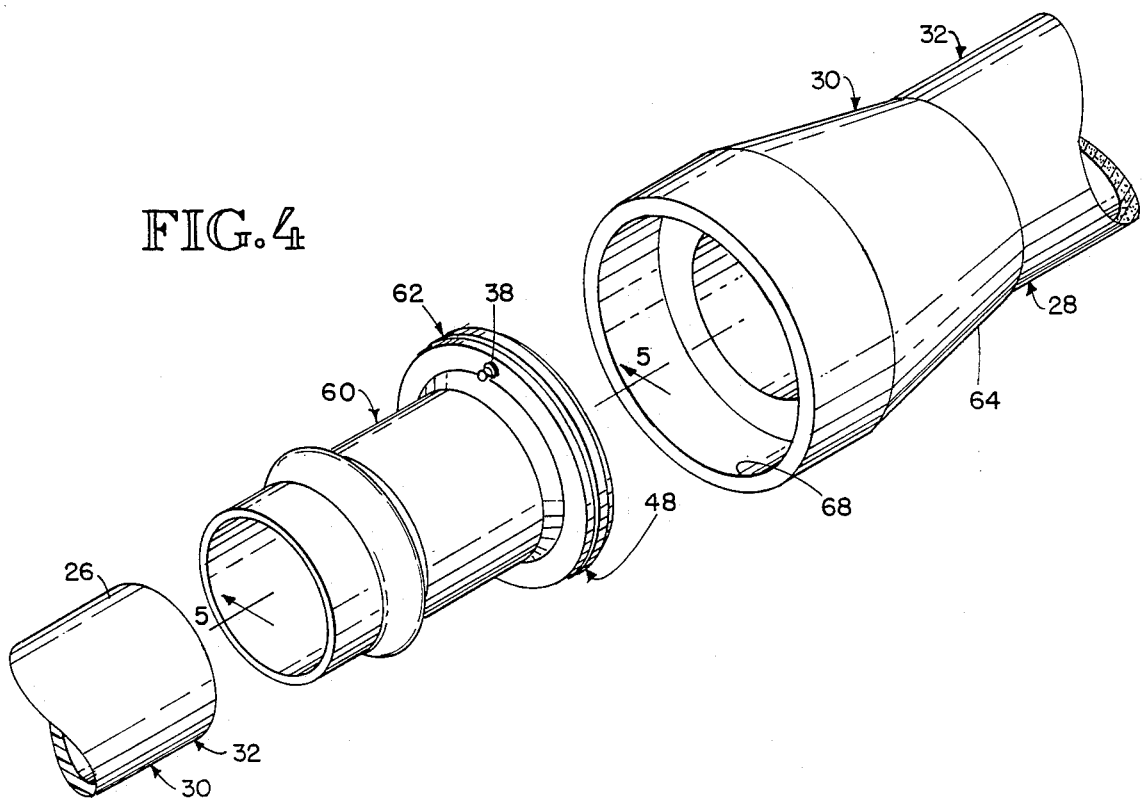
FIG. 4 is an exploded perspective view, with some portions removed, to show the arrangement of a plastic pipe, a plastic pipe coupling, and a concrete pipe being assembled into an underground sealed liquid distribution system, with the plastic pipe coupling equipped with another embodiment of this pipe seal.

In FIG. 4, a plastic pipe coupling 60 and a concrete pipe 28 are shown before their assembly, as components 30 of an underground sealed liquid distribution system 32. The plastic pipe coupling 60 is equipped inside at one end with a pipe seal 34 which is to be considered a standard seal, which is supplied with such couplings 60. This seal 34 creates the seal between a PVC pipe, not shown in FIG. 4, and the plastic pipe coupling 60.

In FIG. 5, these components 30 are joined together and the pipe seal 62, which is another embodiment of the pipe seal 20, which is sealably secured, essentially integrally, on the plastic pipe coupling 60, is in position to be finally sealed inside the bell 64 of the concrete pipe 28. In FIG. 6, the final seal between the concrete pipe 28, via the bell 64 thereof, and the plastic pipe coupling 60 has been completed by using this embodiment 62 of the pipe seal 20. As discussed in reference to the utilization of the embodiment 24 of the pipe seal 20, shown in FIGS. 1, 2, and 3, the injection of a solidifiable liquid 36 is undertaken to move the circumferential seal 48 into the sealing position, and to thereafter, upon solidification of the liquid 36, to keep projecting side 50 in sealing contact with the interior rough surface 66 of the bell 64 of the concrete pipe 28.

In FIG. 7, a plastic pipe 26, generally a PVC pipe 26, a manhole adapter 70, and portions of a concrete manhole 72 are shown, before being assembled as components 30, in an underground sealed liquid distribution system 32. The manhole adapter 70, has an embodiment 74, of the pipe seal 20, which is quite similar to the embodiment 62, and which is sealably secured, essentially integrally, to the exterior of this manhole adapter 70. This projecting side 50 of the circumferential seal 48 has a convex sealing surface 76, which accommodates more possible misalignment of the pipe 26 and manhole 72, in reference to a perpendicular position. Also this convex sealing surface 76 enhances the completeness of the sealing against very rough concrete surfaces, which also may not be too circular in respect to the pipe receiving hole 78.

In FIG. 8, the interim assembly of the plastic pipe 26 and the manhole 72 is shown, with the manhole adapter 70, equipped with the pipe seal embodiment 74 in place, before the final sealing is undertaken. Then in FIG. 9, the final sealing is illustrated, and the injection of the solidifiable liquid 36 has been undertaken, as previously described in reference to the other embodiments of the pipe seal 20 and their final sealing.

In FIGS. 10 and 11, another embodiment 80 of the pipe seal 20 is illustrated, which, at the outset is independently positioned, when a pipe is being sealably positioned into a circular opening 78 of a concrete manhole 72. The pipe may be a PVC pipe 26, a concrete pipe 28, a steel pipe, a corrugated metal pipe, or a cast iron pipe. This pipe seal 20, in this embodiment 80, has a circular positioner 82, which is "H" shaped to provide two circular openings 38, which each receive a circumferential seal 48 having a projecting side 50, in turn having a planar sealing surface 58. After the positioning of the pipe, such as a PVC pipe 26, into the pipe receiving hole 78 or circular opening 78 of the concrete manhole 72, this embodiment 80 of the pipe seal 20, is finally positioned, having first been placed over the end of the PVC pipe 26 before the entry thereof through the circular opening 78. Then, as shown in FIG. 11, the injection of the solidifiable liquid 36 is undertaken to complete overall sealing of the PVC pipe 26 into the manhole 72. The injection procedures, in respect to the movement of each circumferential seal 48 are undertaken as before, except there is a need to coordinate the injections. Equal amounts of the mixed liquids, respectively must reach the respective starting volumes 42 and the respective circular receiving volumes 44 at the same injection times of like quantities and like pressures, in order to center the "H" shaped circular positioner 82, and thereby center the pipe seal embodiment 80, between the PVC pipe and the concrete manhole 72, with respect to the opening 78.

In FIGS. 12 and 13, the installation of a plastic pipe and a corrugated pipe 86 is illustrated to show how a convex sealing surface 76 is utilized on the projecting side 50 of each circumferential seal, slidably and initially positioned by the "H" shaped circular positioner 82 of this pipe seal embodiment 84. By using such convex sealing surfaces 76, possible greater misalignments of a pipe 26 and another component 30, such as a corrugated pipe 86 or a concrete manhole 72 are accommodated. Also these convex sealing surfaces 76 are especially useful when a corrugated steel pipe 86 is being sealed in other combinations of components 30 of an underground sealed liquid distribution system 32.

In addition to the illustrated arrangements of components 30 of underground sealed liquid distribution systems 32, there are other arrangements of such components 30, not shown, wherein the pipe seals 20, in their selected embodiments, are utilized. By way of further example, the components 30 include, a tee connection to a sewer pipe, a pipe connection to a reservoir, a corrugated pipe connection to a corrugated pipe, other pipes connected to corrugated pipes, and high pressure repair couplings installed in broken or failed pipes of all types and sizes, often connecting new sections of other types of pipes. Large variations in pipe diameters, pipe surfaces, and pipe misalignments, are all readily accommodated through an extensive pressure range by using these pipe seals 20.

Some of the materials used in reference to the portions of these pipe seals 20, are:

Regarding the general specifications of the materials used in reference to the portions of these pipe seals 20:

The circular positioner is made of plastic materials which become quite hard and are essentially non resilient. These materials must be able to sustain cold temperatures;

The circumferential seals are made of rubber, synthetic rubber, or other materials which are resilient, tough, and not temperature sensitive, while maintaining an excellent seal;

The solidifiable liquids, derived generally by combining at least two liquids, when mixed, must have a liquid life that is long enough to insure a uniform distribution of the solidifiable liquid throughout the volume that is adjacent the circumferential seal. Thereafter, the liquid must solidify without contracting and so remain through the operating times and temperature ranges;

The adhesives used to secure the circular positioner to one of the components in some of the installations must be very durable during the overall temperature ranges and be compatible to both the component and the circular positioner. Any metal fasteners used must be made of materials that will not corrode.

Materials that satisfy these general specifications are commercially available.

Additional comments:

The circular positioner is made of plastic materials and other commonly used pipe or coupling materials such as ductile iron, steel, corrugated pipe products, etc; and depending upon manufacturing methods would be welded to other embodiments or be an monolithic part created by injection molding or casting.

I claim:

1. A manhole adapter assembly to seal a pipe about the exterior of an inserted end thereof to the interior of an opening in the side of a manhole, comprising:

(a) a cylindrical rigid sleeve, having one end of uniform thickness insertable into the opening in the side of said manhole, while leaving a surrounding clearance to receive a sealing subassembly, and having the other end extending out from the side of said manhole, while providing at this other extending end an internal circular recess to receive an interior circular seal;

(b) said sealing subassembly to be secured firmly about the exterior of the one end having a uniform thickness of the cylindrical rigid sleeve, wherein this sealing subassembly comprises: a circular positioner having a channel crosssectional shape opening inwardly toward the side of said manhole, having a channel-base interior diameter sized to fit securely about the exterior of the one end of uniform thickness of this cylindrical rigid sleeve, and having the channel interior cross-sectional shape sized to fully receive a circumferential seal of a resilient sealing material, and having a valve fitting to receive a liquid and distribute the liquid about the interior of the channel interior cross-sectional shape, having said circumferential seal of said resilient sealing material fitted within the channel interior cross-sectional shape of the circular positioner, and having the liquid for passing through the valve fitting and being distributed around the channel interior cross-sectional shaped and expanded to radially move the circumferential seal to bear against the manhole about the opening in the side of said manhole; and (c) said interior circular seal of resilient sealing material partially fitted into the interior circular recess at the other extending end of the cylindrical rigid sleeve and extending radially out of the interior circular recess a sufficient radial distance to firmly seal around an inserted end of said pipe.

2. A manhole adapter assembly, as claimed in claim 1, wherein the circumferential seal of said resilient sealing material that is fitted within the channel interior cross-sectional shape of the circular positioner, has a concave surface facing radially inwardly to receive the radially expanding liquid, that forces this seal of resilient sealing material into firm contact with the manhole about the opening in the side of the manhole.

* * * * *